(12) United States Patent
Jung et al.

(10) Patent No.: US 7,925,267 B2
(45) Date of Patent: Apr. 12, 2011

(54) METHOD FOR TRANSMITTING BROADCAST CHANNEL IN A CELLULAR WIRELESS COMMUNICATION SYSTEM

(75) Inventors: Young-Ho Jung, Seoul (KR); Jae-Hak Chung, Seoul (KR); Seung-Hoon Nam, Seoul (KR); Yung-Soo Kim, Seongnam-si (KR); Sung-Hyun Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1485 days.

(21) Appl. No.: 11/332,660

(22) Filed: Jan. 13, 2006

(65) Prior Publication Data

US 2006/0154672 A1    Jul. 13, 2006

(30) Foreign Application Priority Data

Jan. 13, 2005  (KR) .................. 10-2005-0003488

(51) Int. Cl.
*H04W 72/00*    (2009.01)
(52) U.S. Cl. ......... 455/450; 455/509; 455/515; 455/503
(58) Field of Classification Search .......... 370/328–333; 455/450–451
See application file for complete search history.

(56) References Cited

U.S. PATENT DOCUMENTS

| | | | |
|---|---|---|---|
| 6,256,509 B1 * | 7/2001 | Tanaka et al. ................. | 455/515 |
| 6,680,920 B1 * | 1/2004 | Wan .............................. | 370/311 |
| 7,623,483 B2 | 11/2009 | Yi et al. | |
| 2002/0080816 A1 * | 6/2002 | Spinar et al. .................. | 370/449 |
| 2003/0032462 A1 | 2/2003 | Wang et al. | |
| 2003/0223394 A1 * | 12/2003 | Parantainen et al. ......... | 370/336 |
| 2004/0244050 A1 | 12/2004 | Kim | |
| 2006/0029011 A1 * | 2/2006 | Etemad et al. ................ | 370/311 |
| 2007/0254644 A1 * | 11/2007 | Dobson et al. ............... | 455/423 |

FOREIGN PATENT DOCUMENTS

| EP | 1473956 | 11/2004 |
|---|---|---|
| KR | 102004004072 | 5/2004 |
| KR | 102004010244 | 12/2004 |

OTHER PUBLICATIONS

IEEE 802.16: Part 16: Air Interface for Fixed Broadband Wireless Access Systems, IEEE Standard, 2004.

* cited by examiner

*Primary Examiner* — Dai A Phuong
(74) *Attorney, Agent, or Firm* — The Farrell Law Firm, P.C.

(57) ABSTRACT

A method for transmitting to one cell a frame including broadcast channels in a cellular wireless communication system in which a base station supports a plurality of physical channels corresponding to the broadcast channels. The base station generates the frame and transmits the generated frame to a mobile station. The frame includes separate broadcast channels for the respective physical channels. A position, in the frame, of a first broadcast channel for a physical channel capable of supporting a mobile station having the worst channel state is fixed in all of transmission frames. The first broadcast channel includes positional information of the remaining broadcast channels except for the first broadcast channel. The mobile station detects only an address of a broadcast channel for a physical channel allocated thereto from the first broadcast channel among broadcast channels belonging to the frame.

4 Claims, 9 Drawing Sheets

METHOD FOR TRANSMITTING BROADCAST CHANNEL IN A CELLULAR WIRELESS COMMUNICATION SYSTEM

PRIORITY

This application claims priority under 35 U.S.C. §119 to an application entitled "Method for Transmitting Broadcast Channel in a Cellular Wireless Communication System" filed in the Korean Intellectual Property Office on Jan. 13, 2005 and assigned Ser. No. 2005-3488, the contents of which are incorporated herein by reference.

BACKGROUND OF THE INVENTION

1. Field of the Invention

The present invention relates generally to a method for transmitting a broadcast channel in a cellular wireless communication system, and in particular, to a method for transmitting a broadcast channel in a cellular wireless communication system in which at least two physical channels having different channel allocation criteria according to channel characteristics are supported.

2. Description of the Related Art

Generally, in a cellular wireless communication system, it is essential for a base station to transmit a broadcast channel when transmitting data to a mobile station. Herein, "broadcast channel" refers to a channel including MAP information, various channel information and paging information transmitted from a base station to a mobile station.

In particular, because the MAP information is information on a frame structure, a mobile station should receive the MAP information in order to detect corresponding data from a corresponding frame. Therefore, the MAP information is transmitted such that it will be received even at a mobile station having a poor channel state, such as a mobile station that is located at a cell boundary. To this end, a base station encodes transmission data at a high code rate before transmission so that even a mobile station having a poor channel state can detect the transmission data.

However, because mobile stations having a good channel state and mobile stations having a poor channel state coexist in one cell, a base station supporting a single physical channel has no choice but to transmit data to accommodate mobile stations having a poor channel state. In this case, the base station encodes data at a high code rate before transmission, which is then transmitted to all mobile stations in the cell, even mobile stations having a good channel state, resulting in a waste of transmission resources.

SUMMARY OF THE INVENTION

The present invention provides a method for transmitting separate broadcast channels for individual physical channels according to channel states of mobile stations existing in one cell.

In transmitting a plurality of broadcast channels, the present invention transmits positional information of the broadcast channels using a broadcast channel for a physical channel having the worst channel state.

In transmitting a plurality of broadcast channels, the present invention transmits positional information of the broadcast channels using a preamble.

In accordance with one aspect of the present invention, a method is provided for transmitting a frame including broadcast channels in a cellular wireless communication system in which a base station supports a plurality of physical channels corresponding to the broadcast channels to one cell. In the method, the base station generates the frame and transmits the generated frame to a mobile station. The frame includes separate broadcast channels for the respective physical channels. A position, in the frame, of a first broadcast channel for a physical channel capable of supporting a mobile station having the worst channel state among the physical channels is fixed in all of transmission frames. The first broadcast channel includes positional information of the remaining broadcast channels except for the first broadcast channel among the broadcast channels. The mobile station detects only an address of a broadcast channel for a physical channel allocated thereto from the first broadcast channel among broadcast channels belonging to the frame.

Preferably, the positional information of the remaining broadcast channels is included in a frame control header (FCH) of the first broadcast channel.

Preferably, the broadcast channels and data channels for the respective physical channels are repeatedly transmitted in units of the physical channels. Alternatively, the broadcast channels and data channels for the respective physical channels are transmitted in such a manner that the data channels are transmitted after the broadcast channels are transmitted.

In accordance with another aspect of the present invention, a method is provided for transmitting a frame including broadcast channels in a cellular wireless communication system in which a base station supports a plurality of physical channels corresponding to the broadcast channels to one cell. In the method, the base station generates the frame, and transmits the generated frame to a mobile station. The frame includes separate broadcast channels for the respective physical channels. The frame includes separate preambles for the respective physical channels. The preambles include positional information of broadcast channels for corresponding physical channels.

Preferably, the preambles provided for the respective physical channels are united into one preamble before being transmitted. Preferably, the broadcast channels and data channels for the respective physical channels are repeatedly transmitted in units of the physical channels. Alternatively, the broadcast channels and data channels for the respective physical channels are transmitted in such a manner that the data channels are transmitted after the broadcast channels are transmitted. (Please note that these contents are the subject matter of the present invention, so please maintain as it is.)

As described above, the present invention is featured in that when a plurality of physical channels exist in one cell according to channel states of mobile stations, each physical channel is transmitted over a different broadcast channel.

For example, a mobile station, which has a good channel state as it moves at low speed in the center of the cell, can use a Band Adaptive Modulation and Coding (AMC) channel, and a mobile station, which has a poor channel state as it moves at high speed at the cell boundary, can use a diversity channel. In such a case, every mobile station in the one cell is supported by a different physical channel and thus, transmission data of each physical channel also has a different code rate, so that a broadcast channel is individually transmitted for each physical channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

Figure 1:
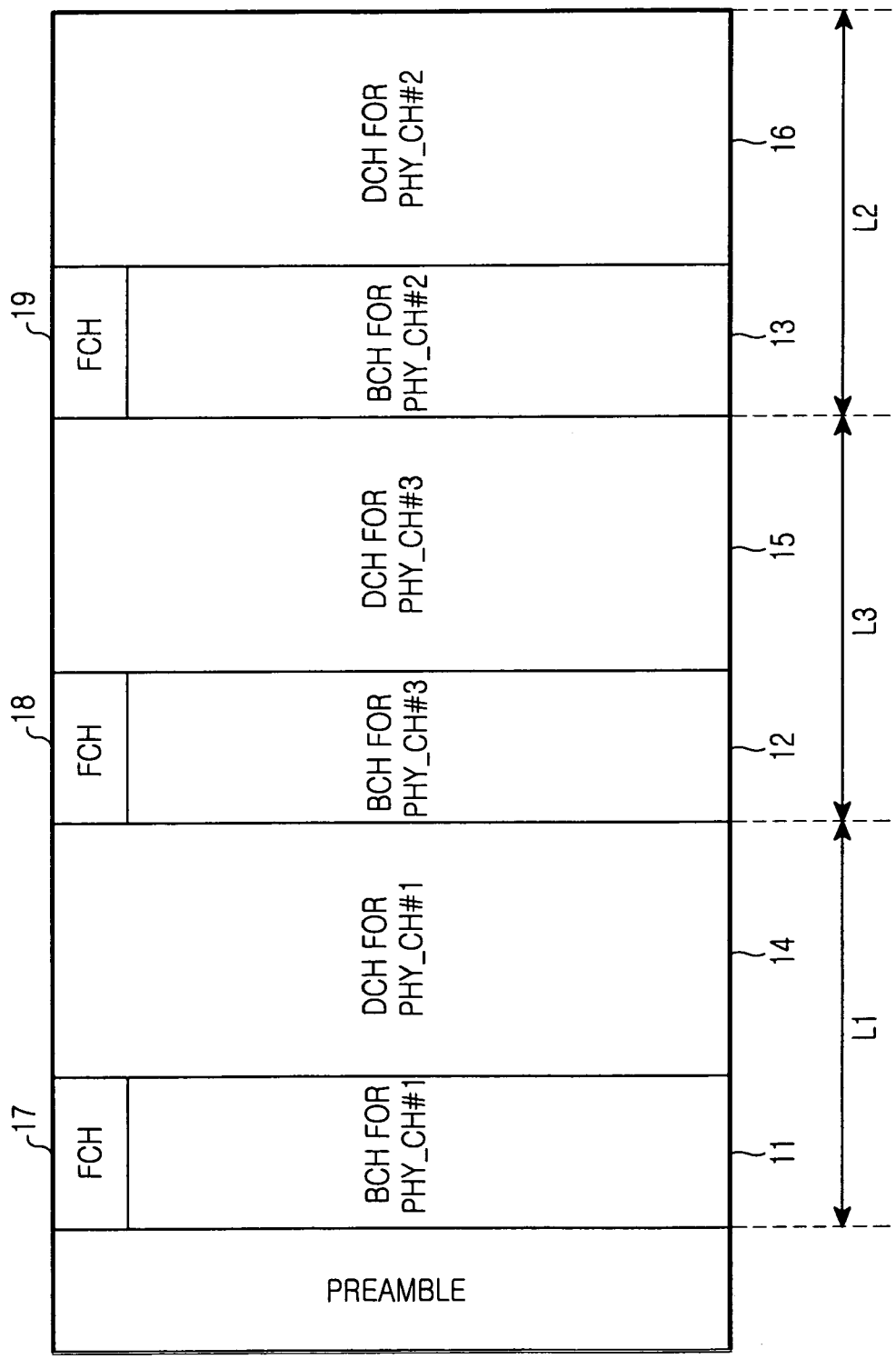
FIG. 1 is a diagram illustrating a frame structure for transmission of broadcast channels according to a first embodiment of the present invention.

FIG. 1 is a diagram illustrating a frame structure for transmission of broadcast channels according to a first embodiment of the present invention.

Figure 2:
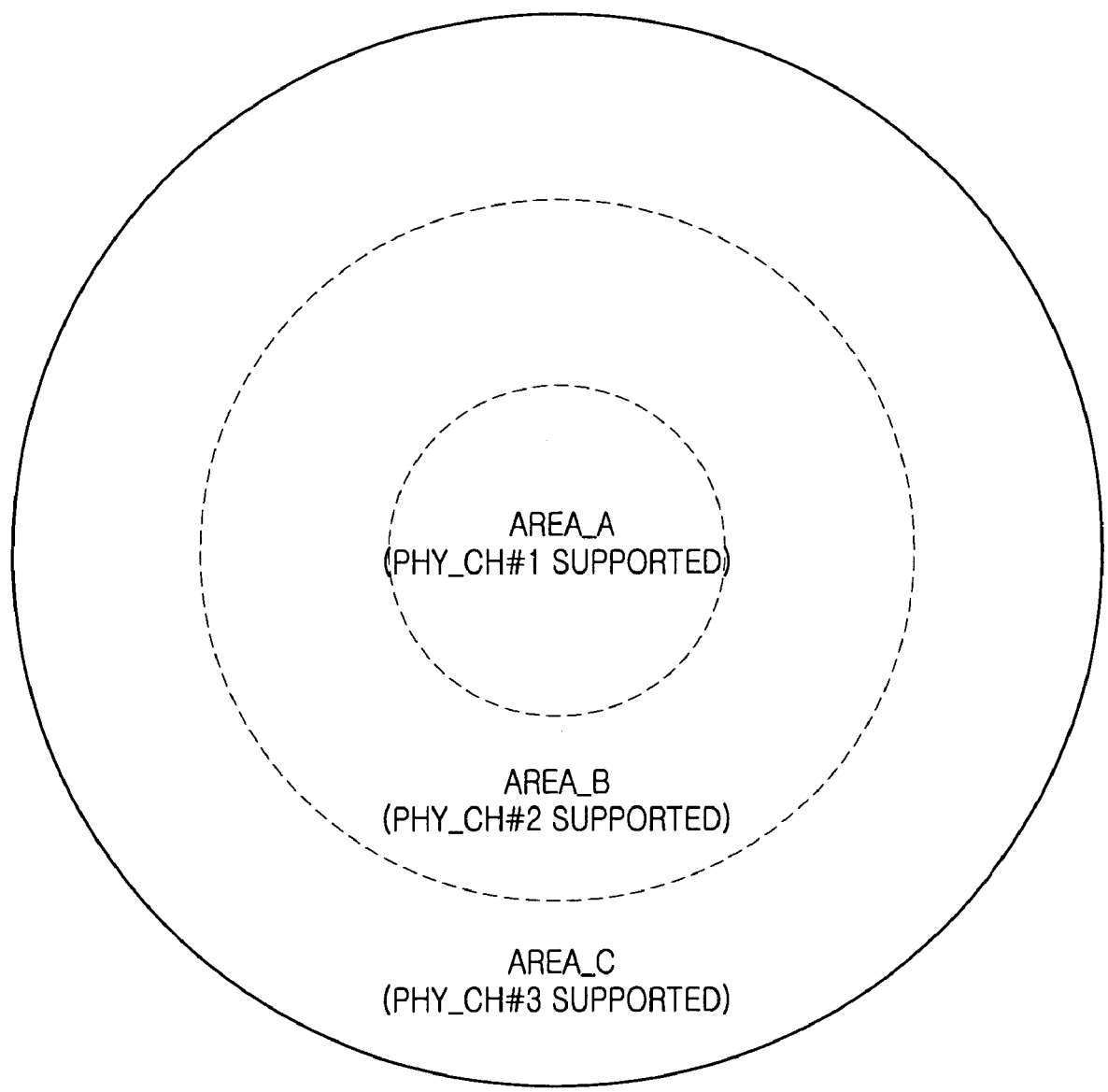
FIG. 2 is a diagram illustrating area boundaries for respective physical channels in a cell according to a first embodiment of the present invention.

The first embodiment proposes a method of transmitting broadcast channels (BCHs) in a cell where its full area is divided into 3 areas, Area_A, Area_B and Area_C, according to types of physical channels (PHY_CH#1, PHY_CH#2 and PHY_CH#3, respectively) as illustrated in FIG. 2. Although it is assumed herein that the number of physical channels supported in one cell is 3, the number of the physical channels is extensible and may vary.

As illustrated in FIG. 1, the first embodiment transmits individual broadcast channels 11 to 13 for respective physical channels. Data channels (DCHs) 14 to 16 for the respective physical channels transmit data which is encoded by different encoding methods or at different code rates. It is assumed herein that the respective areas have a better channel state in the order of Area_A>Area_B>Area_C, such that Area_A has the best channel state.

The first embodiment is characterized in that the broadcast channel 12 for physical channel #3 having the worst channel state is fixed to a specific position in the frame. Although broadcast channel 12 is located in a second position for the physical channels in FIG. 1, it can also be located in the position of broadcast channel 11 for physical channel #1 or broadcast channel 13 for physical channel #3. That is, the position of a broadcast channel for a physical channel can be randomly set irrespective of the better channel state order of physical channels.

A frame control header (FCH) 18 of broadcast channel 12 for physical channel #3 includes information on positions of broadcast channels 11 and 13 for the other physical channels #1 and #3, in the frame.

After transmitting the broadcast channels in this manner, a base station includes information on a type and position of the physical channel allocated to the current frame in the MAP information of the next frame to indicate a current area of a mobile station and also indicate a type of physical channel according thereto. In this way, the base station can adjust the number of bits according to the number of physical channels supported by the cell and provide information on a corresponding physical channel and its position.

A mobile station then finds out positional information in the frame for a broadcast channel for a physical channel allocated thereto by analyzing the previously received FCH 18 of broadcast channel 12 for physical channel #3, and detects a corresponding broadcast channel to acquire its information.

That is, in the present invention, it is not necessary for all mobile stations to detect all of the received broadcast channels. When performing initial communication in each cell, a mobile station starts communication with a physical channel capable of supporting a mobile station having the worst channel state, and detects information on a type and position of a physical channel allocated thereto from the MAP information of the next received frame. Then the mobile station detects a position of a broadcast channel for a physical channel allocated thereto from a FCH of a broadcast channel for the physical channel capable of supporting the mobile station having the worst channel state, using the type and positional information of the physical channel allocated thereto, detected from the MAP information, and then detects only the broadcast channel for the physical channel allocated thereto. That is, according to the present invention, a mobile station is allowed to simply detect a broadcast channel for a physical channel capable supporting a mobile station having the worst channel state and a broadcast channel for a physical channel allocated thereto. An increase in number of types of physical channels supporting this characteristic contributes to an increase in the effect.

Additionally, transmission lengths L1 to L3 of broadcast channels and data channels for respective physical channels are variable.

Figure 3:
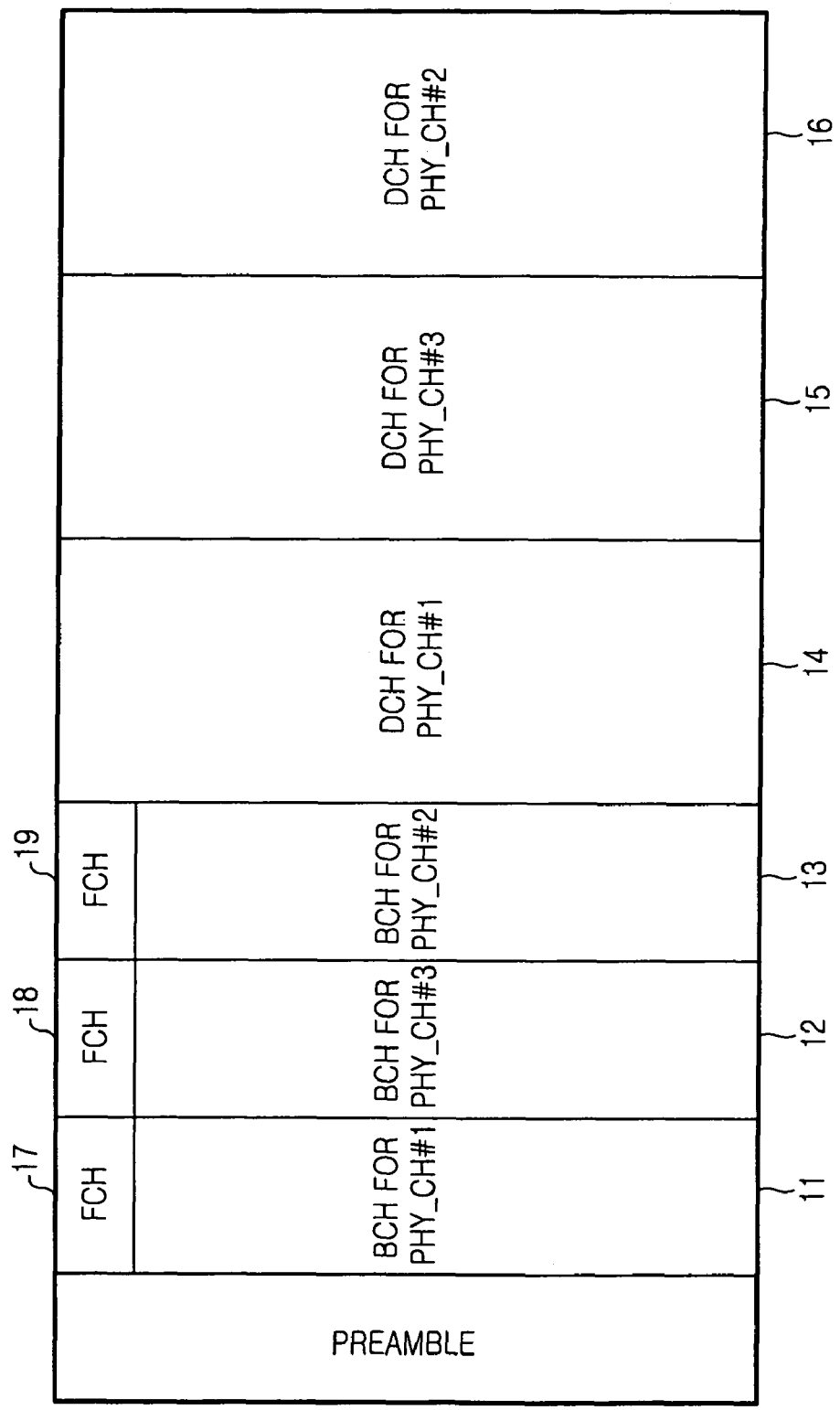
FIG. 3 is a diagram illustrating a frame structure for transmission of broadcast channels according to a second embodiment of the present invention.

FIG. 3 is a diagram illustrating a frame structure for transmission of broadcast channels according to a second embodiment of the present invention.

The second embodiment proposes a different method of transmitting broadcast channels in the same condition as that of the first embodiment. Thus, the same elements are denoted by the same reference numerals even though they are depicted in different drawings.

The second embodiment provides a method for separating broadcast channels 11 to 13 and data channels 14 to 16 for a respective physical channel as illustrated in FIG. 3, and transmitting the data channels 14 to 16 after transmitting the broadcast channels 11 to 13.

In the same manner, a position between the broadcast channels 11 to 13 in the frame is variable and a position between the data channels 14 to 16 in the frame is also variable. Only the broadcast channel 12 for the physical channel #3 having the worst channel state is fixed so that it can be detected by all mobile stations.

Although it is assumed in the second embodiment that the number of physical channels supported in one cell is 3, the number of the physical channels is extensible and may be varied.

Figure 4:
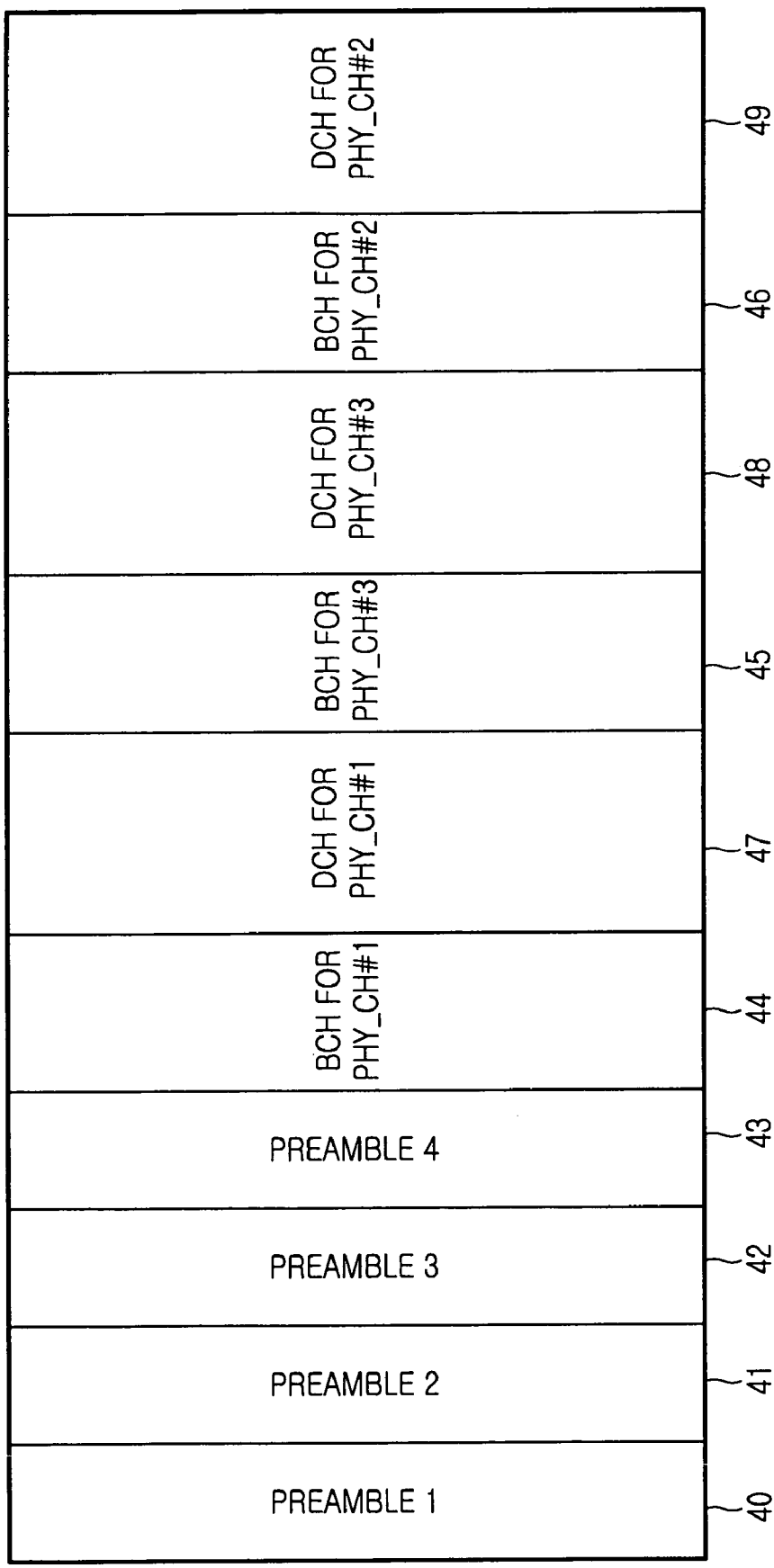
FIG. 4 is a diagram illustrating a frame structure for transmission of broadcast channels according to a third embodiment of the present invention.

FIG. 4 is a diagram illustrating a frame structure for transmission of broadcast channels according to a third embodiment of the present invention.

The third embodiment proposes a method of separately providing preambles 41 to 43 for respective physical channels as illustrated, and transmitting positional information of a broadcast channel for a corresponding physical channel at each preamble.

Specifically, a preamble #1 40 is a preamble basically provided for time and frequency synchronization. A preamble #2 41 includes positional information of a broadcast channel 44 for a physical channel #1. Similarly, a preamble #3 42 includes positional information of a broadcast channel 45 for a physical channel #3, and a preamble #4 43 includes positional information of a broadcast channel 46 for a physical channel #2. Positions of the preamble #2 41, the preamble #3 42, and the preamble #4 43 are exchangeable with each other, and positions of the corresponding broadcast channels 44 to 46 and data channels 47 to 49 are also exchangeable with each other.

Figure 5:
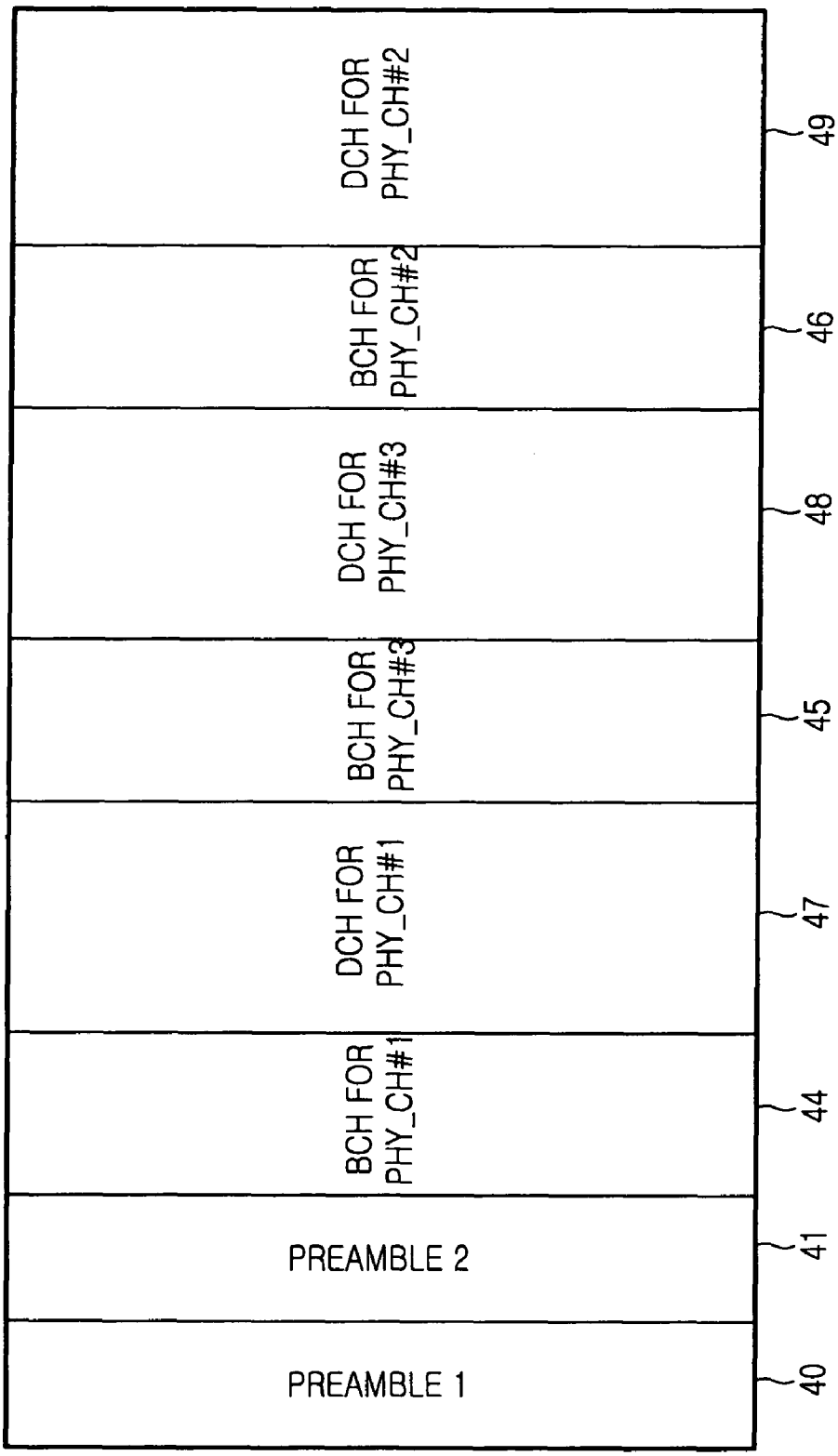
FIG. 5 is a diagram illustrating a frame structure for transmission of broadcast channels according to a fourth embodiment of the present invention.

In an alternative embodiment, the preamble #2 41, the preamble #3 42, and the preamble #4 43, as illustrated in FIG. 4, can be united into one preamble as illustrated in FIG. 5 so that the preamble #2 41 includes positional information of all of the broadcast channels 44 to 46. In another alternative embodiment, the preamble #2 41, the preamble #3 42, and the preamble #4 43, as illustrated in FIG. 4, for positional information of the broadcast channels 44 to 46 can be united into the preamble #1 40 for synchronization as illustrated in FIG. 6 so that the preamble #1 40 includes positional information of all of the broadcast channels 44 to 46.

Figure 6:
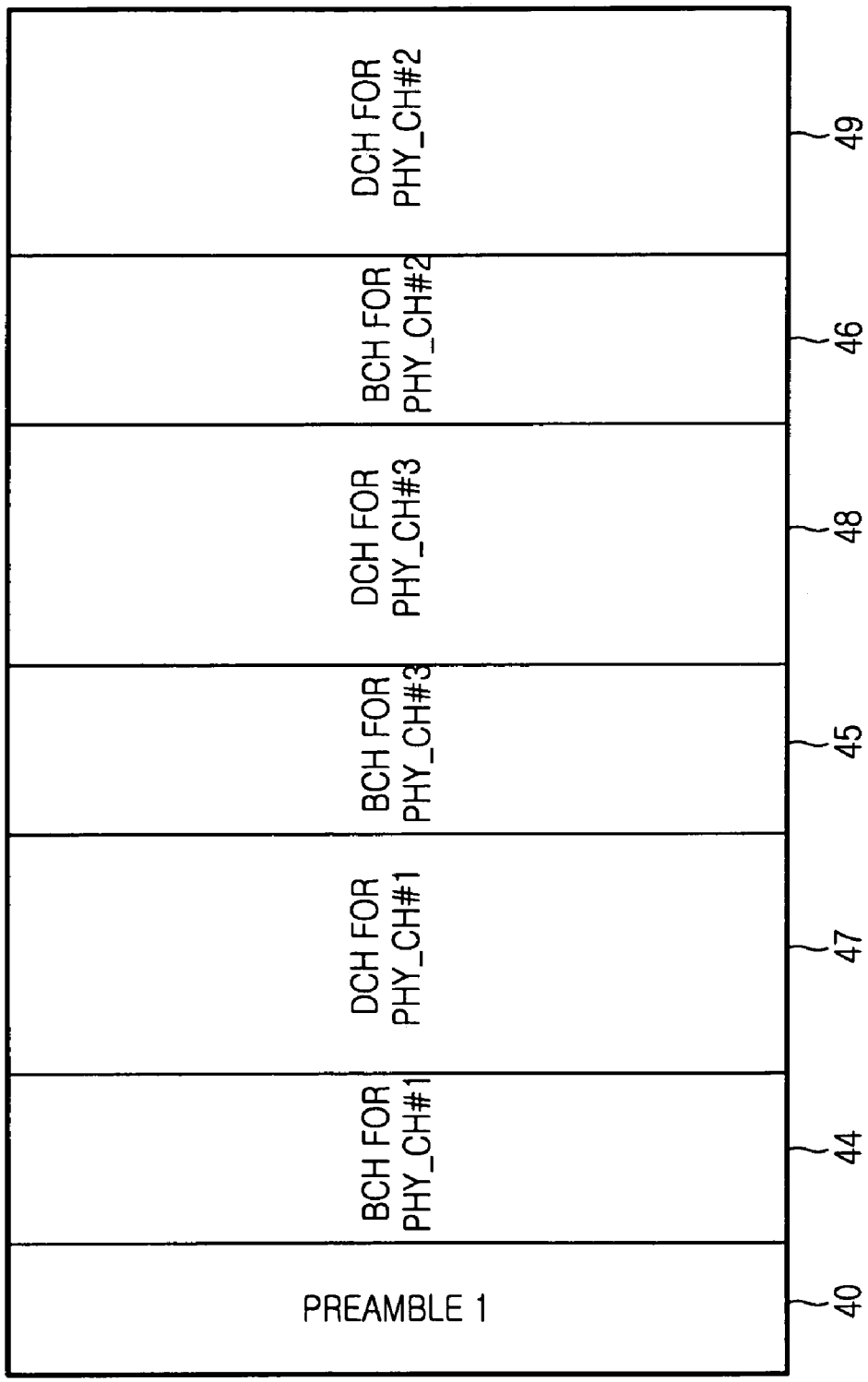
FIG. 6 is a diagram illustrating a frame structure for transmission of broadcast channels according to a fifth embodiment of the present invention.
Figure 7:
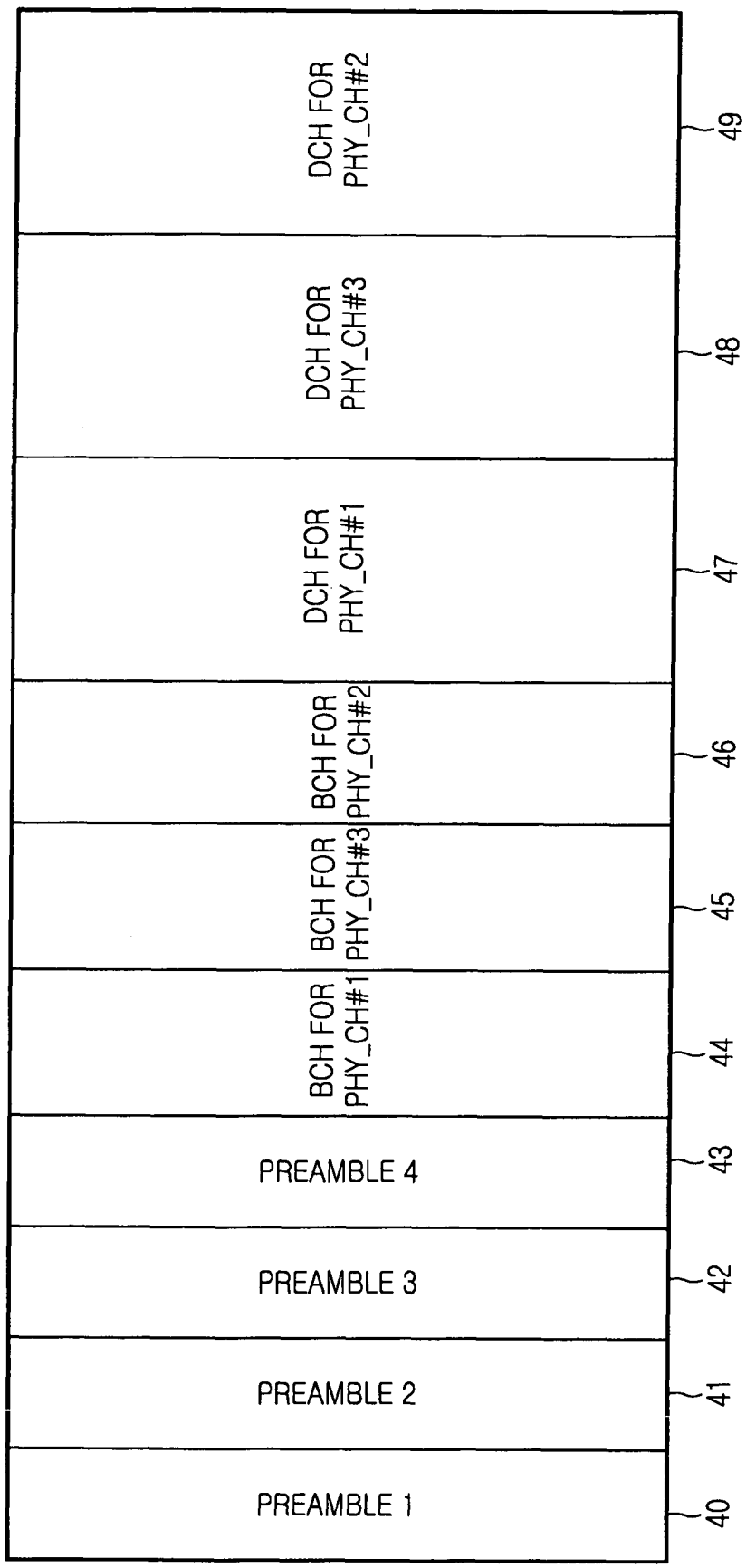
FIG. 7 is a diagram illustrating a frame structure for transmission of broadcast channels according to a sixth embodiment of the present invention.
Figure 8:
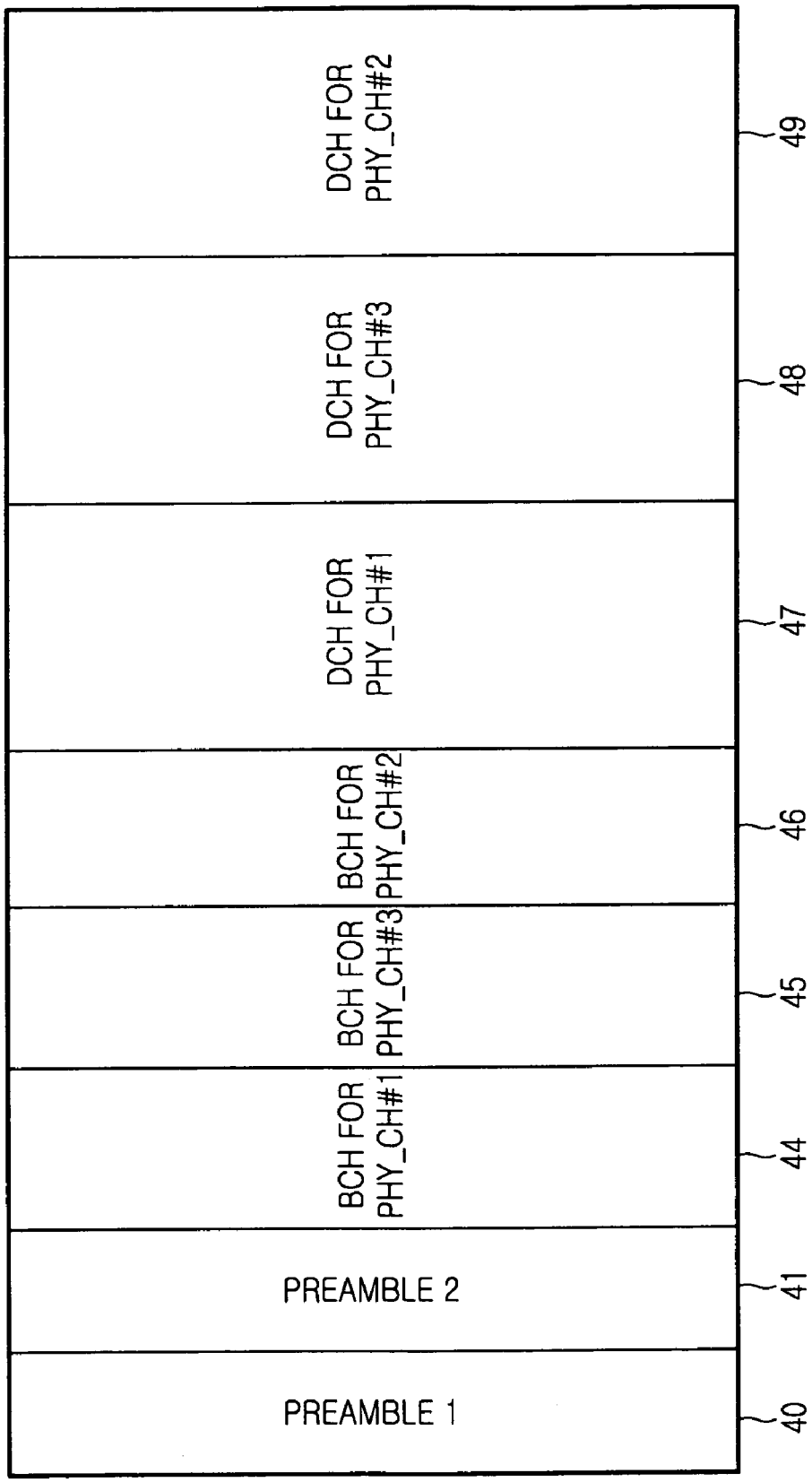
FIG. 8 is a diagram illustrating a frame structure for transmission of broadcast channels according to a seventh embodiment of the present invention.
Figure 9:
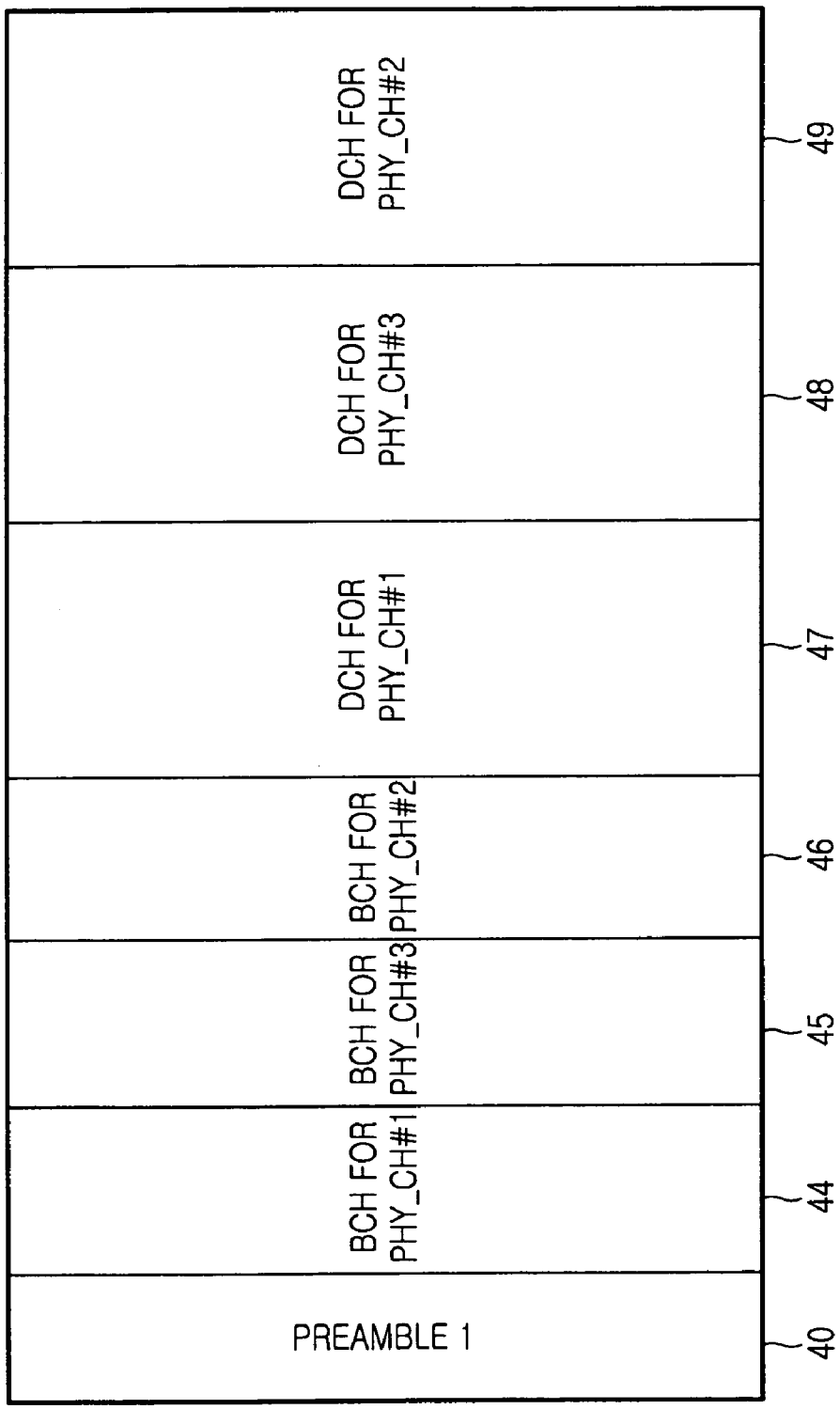
FIG. 9 is a diagram illustrating a frame structure for transmission of broadcast channels according to an eighth embodiment of the present invention.

Other embodiments illustrated in FIGS. 7 to 9 are similar to the embodiments illustrated in FIGS. 4 to 6, respectively, in terms of a form of preambles including positional information of broadcast channels, and only the arrangement of broadcast channels and corresponding data channels in the embodiments of FIGS. 7 to 9 are changed in the manner shown in the second embodiment of FIG. 3.

That is, the embodiments illustrated in FIGS. 4 to 9 provide a method of transmitting positional information of respective broadcast channels through preambles, and then transmitting the corresponding broadcast channels and data channels together, or transmitting the data channels after first transmitting the broadcast channels.

The amount of physical resources occupied in the invention will now be described through detailed numerical values.

For example, it will be assumed that if the number of physical channels is 2, a broadcast channel for each physical channel occupies physical resources of 20 bytes. In the case where a single broadcast channel is used as in the conventional method, if data is transmitted at 1/48 of a code rate of a Quadrature Phase Shift Keying (QPSK) scheme as data should be transmitted for a physical channel having the worst channel state, then the amount of occupied physical resources becomes 40*8/2*48=7680 blocks.

However, in the present invention, if data for a physical channel having a better channel state is transmitted at 1/4 of the code rate of the QPSK scheme and a physical channel having a poorer channel state is transmitted at 1/48 of the code rate of the QPSK scheme, the amount of occupied physical resources is given as follows:

According to the present invention, if data is transmitted at 1/4 of the code rate of the QPSK scheme for the physical channel having the better channel state, the amount of occupied physical resources becomes 20*8/2*4=320 blocks, and if data is transmitted at 1/48 of the code rate of the QPSK scheme for the physical channel having the poorer channel state, the amount of occupied physical resources becomes 20*8/2*48=3840 blocks, totaling 4160 blocks. That is, the method proposed in the present invention is much lower than the conventional method in terms of the amount of occupied physical resources.

As described above, the present invention transmits broadcast channels with physical channels at different data rates, thereby contributing to an increase in transmission efficiency of the broadcast channels and a reduction in the amount of occupied physical resources. Thus a mobile station receiving the broadcast channels is not required to detect all of received broadcast channels, thereby contributing to a reduction in the number of calculations.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a frame including broadcast channels in a cellular wireless communication system in which a base station supports a plurality of physical channels corresponding to the broadcast channels in one cell, the method comprising:
generating the frame by the base station; and
transmitting the generated frame to a mobile station,
wherein the generated frame includes the broadcast channels for each of the physical channels, wherein the generated frame includes preambles for each of the physical channels, and wherein the preambles include positional information indicating the positions of broadcast channels for each of the respective physical channels.

2. The method of claim 1, wherein the preambles provided for each of the physical channels are united into one preamble before being transmitted.

3. The method of claim 2, wherein the broadcast channels and data channels are alternatively transmitted in each of the physical channels.

4. The method of claim 2, wherein the broadcast channels and data channels for each of the physical channels are transmitted in such a manner that all of the data channels are transmitted after all of the broadcast channels are transmitted.

* * * * *